3,360,598
PROCESS OF DRY SPINNING AN AROMATIC POLYCARBONAMIDE FIBER
Carol Reid Earnhart, Richmond, Va., assignor to E. I. du Pont de Nemours and Company, Wilmington, Del., a corporation of Delaware
No Drawing. Filed Dec. 28, 1964, Ser. No. 421,602
8 Claims. (Cl. 264—205)

This invention relates to an improved method for the dry-spinning of high-melting wholly-aromatic polycarbonamide fibers, especially fibers of poly(meta-phenylene isophthalamide). More particularly it relates to such a dry-spinning method whereby fibers are obtained having a reduced halogen ion content and hence an improved resistance to degradation by high temperature exposure.

U.S. Patent 3,063,966 to Kwolek et al. describes the preparation of the high-melting poly(meta-phenylene isophthalamide) from meta-phenylene diamine and isophthaloyl chloride. This polymer is characterized by an unusually high melting point and accordingly fibers, films and other shaped articles thereof are uniquely well suited to a variety of applications where resistance to degradation by high temperature exposure is important.

For purposes of spinning fibers or casting films of poly(meta-phenylene isophthalamide), it is advantageous, as described in U.S. Patent 3,068,188 to Beste et al., to employ solutions of the polymer in an organic solvent having dissolved therein one or more of certain inorganic halide salts. The useful halide salts to be so employed are ones which, in addition to having adequaate solubility in the solvent, are capable of liberating a halogen ion to the extent that a 0.01-normal solution of the salt in the solvent has a specific resistance of less than about 5,000-ohm-centimeters at 20° C. The presence of the halide salt in the solution serves to materially increase the solubility of the polymer in the solvent and also to strongly inhibit the tendency of concentrated polymer solutions to become gelatinous on storage at somewhat elevated temperatures.

The use of halide salts in the above-described polymer solutions introduces a problem, however, in that a shaped article formed therefrom will tend to tenaciously retain the halide salt. Unless the halogen ion content can be reduced to a sufficiently low level, e.g. a mere fraction of a percent halogen, the thermal durability properties of the article will be seriously impaired. In the dry-spinning of fibers from such solutions the halogen ion content can often be sufficiently reduced by exhaustive extraction procedures, usually in baths of heated aqueous liquids. Nevertheless such extraction procedures have been generally unsatisfactory for reasons of economics, i.e. the time of the fiber-forming process becomes prohibitively long and an excessive amount of processing equipment is required.

In accordance with this invention a method has been found to facilitate the removal of halogen ion from poly(metaphenylene isophthalamide) fibers dry-spun from a polymer solution containing an inorganic halide salt. Because fibers so obtained will have exceedingly low halide contents, their properties with respect to thermal durability will be outstanding.

The improved method of the invention pertains to the spinning into a hot gaseous atmosphere a solution comprising poly(meta-phenylene isophthalamide), a solvent of the formula

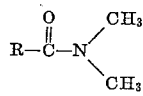

wherein R is alkyl of 1 to 4 carbons, and 0.2 to 15% by weight, based on the solvent, of at least one member of the group consisting of alkali and alkaline earth metal chlorides and bromides. In accordance therewith it has been found that fibers of increased halide extractability are achieved if the temperature of the spinning solution immediately prior to discharging from the spinneret is at least 150° C., and preferably in the range of 155° C. to 165° C. A fiber spun from a solution at such an unusually high spinning temperature and subsequently treated in a heated aqueous liquid, e.g., a water bath, will unexpectedly release its halogen ion content with considerably greater ease than one spun under normal temperature conditions and subjected to an identical liquid treatment. More specifically, the dry-spinning of poly(meta-phenylene isophthalamide) from high temperature solutions in accordance with the invention yields fibers that can be treated by commercially feasible extraction procedures to reduce the halide content to on the order of 0.01% to 0.1%, calculated as chloride ion. Similar extraction procedures when applied to fibers spun at lower solution temperatures, e.g. 110 to 145° C., would enable reductions in halide content to only about 0.2% to 0.5%, also calculated as chloride ion.

The reason for the unexpected increase in halide extractability by the use of unusually high-temperature spinning solutions is not fully understood. In part an explanation for the phenomenon may reside in the creation, during the hot dry consolidation of the fibers, of some form of a fine polymeric structure that is more easily extractable. Values of fiber density remain virtually constant throughout a wide range of spinning solution temperatures, thus suggesting that a different distribution of pore sizes, rather than a significant difference in amount of porosity, may be responsible for the observed differences in extractability. Since physical properties are known to be related to degree of consolidation of a fiber, observed small differences in tenacity and elongation may be considered as partial confirmation of this hypothesis. Peculiarly enough, variations in the rate of hot gas flow during evaporation of solvent as well as changes in temperature of the gas appear to have no significant effect on extractability.

The method of the invention represents an unobvious solution to the problem of halide extractability when it is considered that heretofore it has been generally thought that dry-spinning processes should be operated at temperatures which, although perhaps elevated to achieve an adequate polymer concentration, were otherwise as low as possible. Problems of accelerated polymer or solvent hydrolysis, excess bubble formation in the fiber, the creation of unduly low pressure differentials across the spinnerets, have all generally dictated the use of low spinning solution temperatures.

The poly(meta-phenylene isophthalamide) polymers may be prepared from the appropriate diamine and diacyl halide as, for example, described in the aforementioned Kwolek et al. patent. The polymers will have melting points on the order of 350° C. or above and will be of fiber- and film-forming molecular weight, i.e. as indicated by having inherent viscosity values of at least about 0.6. Inherent viscosities herein are determined at 25° C. in dimethylacetamide containing 4% by weight lithium chloride and at a concentration of 0.5 gm. polymer per 100 cc. of solution.

The polymer solvents found suitable for the improved dry-spinning method of the invention include dimethylformamide, dimethylacetamide, dimethylpropionamide, dimethylbutyramide, and mixtures of any thereof.

The class of suitable alkali and alkaline earth metal halide salts to be employed in accordance with the present invention are described in detail in the aforementioned Beste et al. patent. In solution with the polymer and solvent they should have the capability of liberating a halogen ion to the extent that a 0.01-normal solution of the salt in the solvent has a specific resistance of less than about 5,000 ohm-centimeters at 20° C. The term "specific resistance" denotes the resistance in ohms of 1 cubic centimeter of the material (salt/solvent solution) at a particular temperature (20° C.) and it is measured in the conventional manner such as by the procedure set forth in "Experimental Physical Chemistry," by Daniels, Matthews and Williams, 3rd edition (1941), pages 175 to 180. Typically suitable halide salts include calcium bromide, sodium bromide, ammonium bromide, lithium bromide, lithium chloride, calcium chloride, magnesium chloride and strontium chloride.

Spinning solutions for use in accordance with the invention should contain from about 5 to 26% by weight of dissolved poly(meta-phenylene isophthalamide), but preferably about 15 to 24% by weight thereof. For the most part, the improvement in halide extractability is most pronounced when spinning solution temperatures in the lower part of the range, e.g. closer to 150° C., are used with solutions of higher percent solids, and vice versa. The exact amount of inorganic halide salt to be employed in the spinning solution will depend upon the choice of solvent, the solubility of the particular salt therein, and the polymer concentration desired. Of course, excessive quantities thereof should be avoided as they will tend to make removal of the halide content more difficult. For the most part the amount of salt to be used should be on the order of 0.2 to 15% by weight, but preferably 5 to 12% by weight. It will be apparent that dyes, pigments and other additives may be advantageously combined in the polymer solution.

Apart from the requirement for unusually high spinning solution temperatures, the process conditions of spinning, solvent removal in a flow of heated gas, and halide salt extraction in a heated aqueous liquid, are all generally the same as heretofore practiced in the dry-spinning of wholly-aromatic polycarbonamides, as for example is illustrated in the aforementioned Kwolek et al. patent. Improved halide extractability is realized with spinning solution temperatures up to the atmospheric pressure boiling point of the solution. Moreover temperatures even up to 10° C. or so thereabove can be used so long as the solution is pressurized to prevent boiling.

In the following examples values of melting point are determined by distributing a sample of the polymer along a metal bar heated at one end to provide a temperature gradient along its length and observing the lowest surface temperature at which the polymer shows evidence of consolidation and adhesion to the bar.

Work-to-break ($W_B$), as used in the examples, represents the area under the stress-strain curve developed in measurement of tenacity. This area may be readily ascertained using an integrator attachment furnished with certain types of commercially available testing equipment. Alternatively, it can be calculated by derivation of an equation for the curve and mathematical integration of the area thereunder. If an integrator attachment is not readily available, the area under the curve representing a graphical plot of applied stress in grams per denier vs. percent-elongation may be conveniently determined by simply cutting the particular area out of the graph, and, after ascertaining the weight per unit of area of the same graph paper, converting the weight to an area basis and expressing it as grams per denier.

The following examples illustrate the invention. Parts and percentages are by weight unless otherwise indicated.

EXAMPLE I

Poly(meta-phenylene isophthalamide) of 1.5 inherent viscosity and having a melting point higher than 350° C. is prepared by reacting equimolecular amounts of meta-phenylene diamine and isophthaloyl chloride in dry dimethylacetamide with good agitation and cooling so as to maintain the temperature below 60° C. throughout the reaction. The liberated hydrogen chloride is neutralized by addition of the metathetical quantity of dry calcium hydroxide. The resulting viscous solution contains 20% polymer and 9.3% $CaCl_2$.

The solution so prepared is used for spinning yarn without intermediate isolation of the polymer. After filtration to remove any extrusion orifice-plugging solid matter, it is metered to a spinning head wherein it is heated to 150° C. and passed directly to a spinneret having 200 orifices which are 0.45 mm. in length and 0.15 mm. in diameter. The temperature is measured immediately downstream from a heat exchanger in the flow line just preceding the spinneret, and heat-input is regulated to maintain this temperature within ±1° C. Temperature measurements have shown an increase of about 10° C. from the normal point of measurement to the spinneret orifice (due to the heated inert gas), hence solution temperature just prior to extrusion is 160° C.

The filaments are passed through a cell approximately 18 feet (5.5 meters) in length concurrently with a stream of inert gas which has been heated to 265° C. The gas comprises a mixture of nitrogen and carbon dioxide and contains less than 8% oxygen. The effluent gas is circulated through coolers which condense out the dimethylacetamide and is then reheated, and returned to the cell. The filaments, as removed from the bottom of the cell, contain 110% dimethylacetamide and 46% $CaCl_2$, based on polymer. They are led briefly through a pool of cool water before windup. The yarn, wound up as two threads at 120 y.p.m., contains about 92% dimethylacetamide, 38% $CaCl_2$ and 136% water, based on polymer.

The yarn is unwound from the spinning package and passed at an initial speed of 60 y.p.m. (55 meters per minute) through a series of ten boiling water baths during which time it is stretched to 437% of its length (4.37×-drawn). It is dried by passage over a series of 5 rolls maintained at a surface temperature of 150 C. and one additional roll at 240 C., allowing no relaxation from draw, crystallized by passage over 2 rolls heated to a surface temperature of 340° C. during which time it is drawn to 110% of its previously drawn length (1.1×-draw), and wound up on a down-twister package as 200-denier 100-filament yarns.

The product is found to have a tenacity of 4.7 grams per denier (g.p.d.), an elongation at the break of 22.6%, and a work-to-break ($W_B$) of 0.81 g.p.d. Analysis reveals a halide content of 0.03%, calculated as chloride ion.

A skein of the product of this example is placed in a circulating-air oven maintained at 285° C. for one week. After cooling to room temperature, the yarn is found to have retained 69.7% of its original $W_B$.

*Example II*

The process of Example I is repeated in all respects except for variation in the temperature of the solution delivered to the spinneret. Results are summarized in Table 1.

TABLE 1

| Solution Temp. (° C.) Actual | Halide Retained, as Percent Cl ion | Initial Tenacity/ Elongation (g.p.d./ percent) | Initial $W_B$ (g.p.d.) | Percent $W_B$ retained after 1 wk. at 285° C. |
| --- | --- | --- | --- | --- |
| 140 | 0.30 | 5.42/20.5 | .92 | 31.5 |
| 145 | 0.29 | 5.40/20.9 | .93 | 32.3 |
| 150 | 0.19 | 5.08/18.8 | .75 | 32.1 |
| 155 | 0.13 | 5.09/18.5 | .76 | 39.5 |
| 160 | 0.07 | 5.11/21 | .84 | 48.8 |
| 165 | 0.10 | 5.09/20.2 | .84 | 38.1 |
| 168 | 0.11 | 5.16/20.8 | .88 | 32.9 |

A rapid decline in the halide content is apparent from the above as the spinning solution temperature exceeds 145° C. An optimum temperature range, considering especially the "percent $W_B$ retained" column, is about 155° to 165° C.

Results similar to those given above can be realized by employing dimethylformamide, dimethylpropionamide or dimethylbutyramide in place of the dimethylacetamide thereof and by replacing the calcium chloride with alternate halide salts such as calcium bromide, sodium bromide, ammonium bromide, lithium bromide, lithium chloride, magnesium chloride and strontium chloride.

*Example III*

In another series of tests, Example I is again repeated except that the solution temperature is varied to illustrate in particular the effect of still lower solution temperatures on halide extractability. Results are summarized in Table 2.

TABLE 2

| Actual Solution Temp. °C. | Halide Retained, as percent Cl ion | Percent $W_B$ Retained after 1 wk. at 285° C. |
|---|---|---|
| 125 | 0.42 | |
| 135 | 0.35 | |
| 140 | 0.25 | 34.7 |
| 145 | 0.10 | 46.3 |
| 150 | 0.05 | 57.0 |
| 165 | 0.07 | 62.3 |

The above illustrates the dramatic improvement in halide extractability with spinning solution temperatures above 145° C.

The absolute relationship of chlorine content and solution temperature may vary depending upon overall spinning and extraction equipment and other conditions, but the general relationship that an increase in solution temperature makes the spun yarn more extractable has been found to hold true and is the subject of this invention.

Since many different embodiments of the invention may be made without departing from the spirit and scope thereof, it is to be understood that the invention is not limited except to the extent defined in the following claims.

What is claimed is:

1. In a dry-spinning method for producing high-melting aromatic polycarbonamide fibers by discharging from a spinneret into a hot gaseous atmosphere a solution comprising poly(meta-phenylene isophthalamide), a solvent of the formula

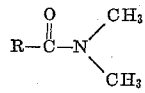

wherein R is alkyl of 1 to 4 carbons, and 0.2 to 15% by weight, based on said solvent, of at least one halide salt of the group consisting of alkali and alkaline earth metal chlorides and bromides; the improvement, for obtaining fibers of increased halide extractability, wherein the temperature of said solution immediately prior to discharging from said spinneret is at least 150° C.

2. Method according to claim 1 wherein said solvent is dimethylacetamide.

3. Method according to claim 1 wherein said halide is calcium chloride.

4. Method according to claim 1 wherein said solution temperature is in the range of about 155° C. to 165° C.

5. Method for producing poly(meta-phenylene isophthalamide) fibers of improved resistance to degradation by high temperature exposure, comprising (a) forming a hot spinning solution of poly(meta-phenylene isophthalamide), a solvent of the formula

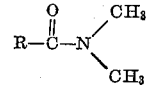

wherein R is alkyl of 1 to 4 carbons, and 0.2 to 15% by weight, based on said solvent, of at least one halide salt of the group consisting of alkali and alkaline earth metal chlorides and bromides, said solution having a temperature of at least 150° C.

(b) extruding said hot spinning solution from a spinneret into an atmosphere of heated gas to remove solvent and provide non-tacky fibers, and thereafter (c) treating said fibers so obtained in a heated aqueous liquid to reduce the halide content thereof to less than about 0.1%, calculated as chloride ion.

6. Method according to claim 5 wherein said solvent is dimethylacetamide.

7. Method according to claim 5 wherein said halide salt is calcium chloride.

8. Method according to claim 5 wherein said solution temperature is in the range of about 155° C. to 165° C.

References Cited

UNITED STATES PATENTS 3,063,966 11/1962 Kwolek et al. _____ 260—78
3,068,188 12/1962 Beste et al. _____ 260—30.2

ALEXANDER H. BRODMERKEL, *Primary Examiner.*

A. H. KOECKERT, *Assistant Examiner.*